Sept. 24, 1940.   J. H. HOFFBERGER   2,216,077
TEMPERATURE REGULATOR FOR REFRIGERATORS
Filed Aug. 13, 1932   2 Sheets-Sheet 2
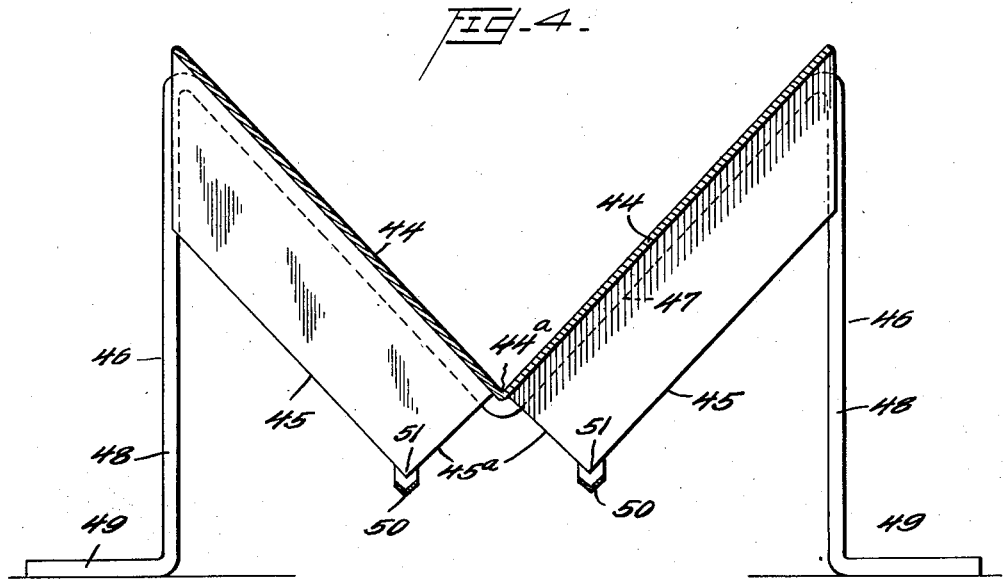
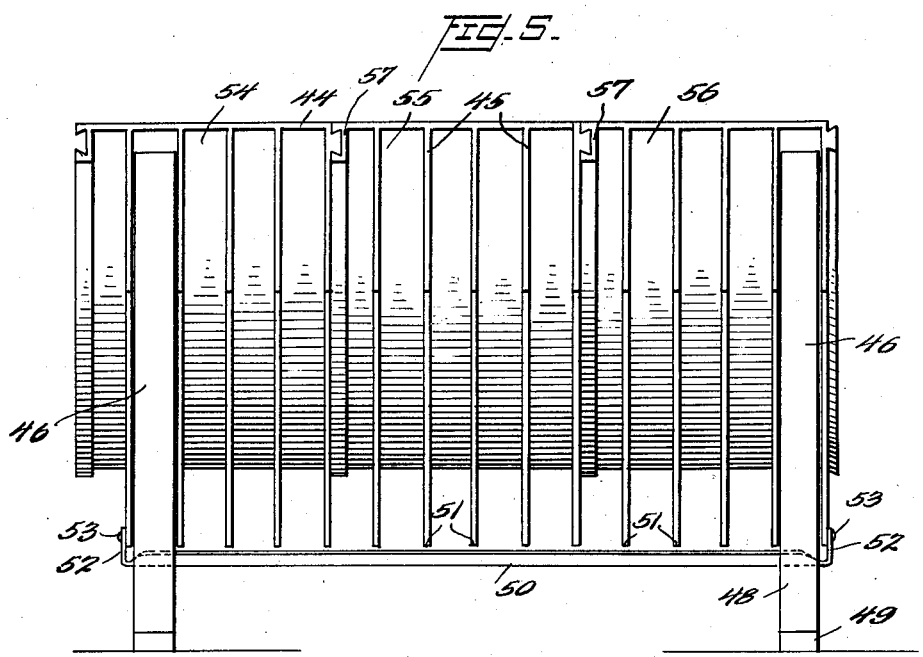
Inventor
J.H.Hoffberger,
By Sol Shapperio
Attorney Patented Sept. 24, 1940

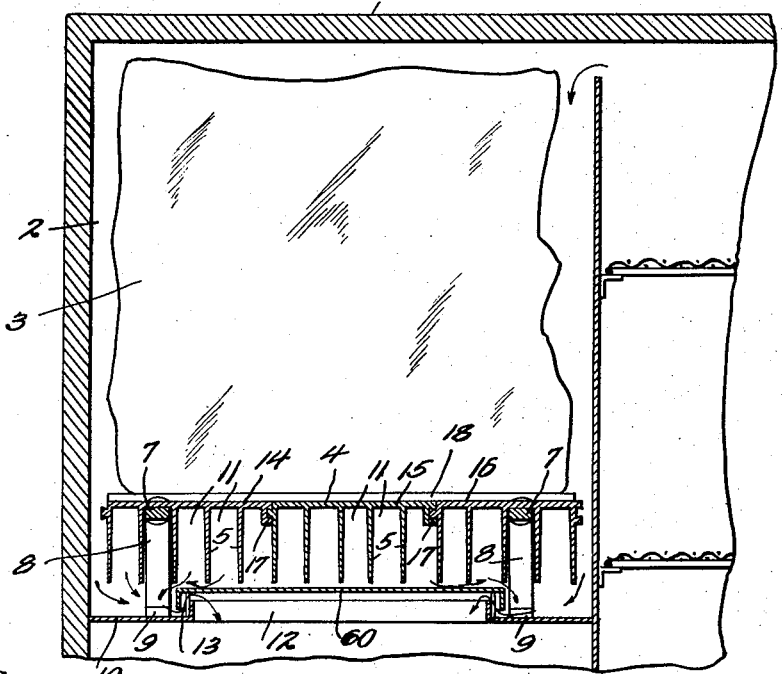
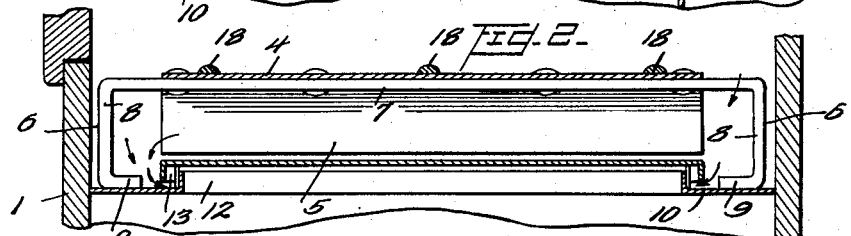
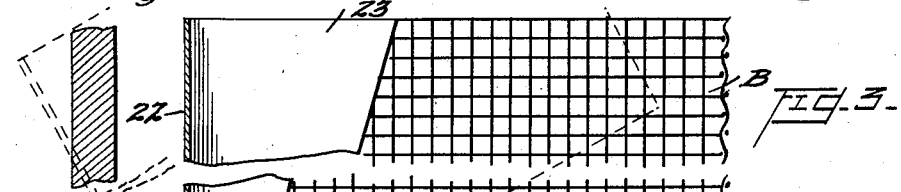
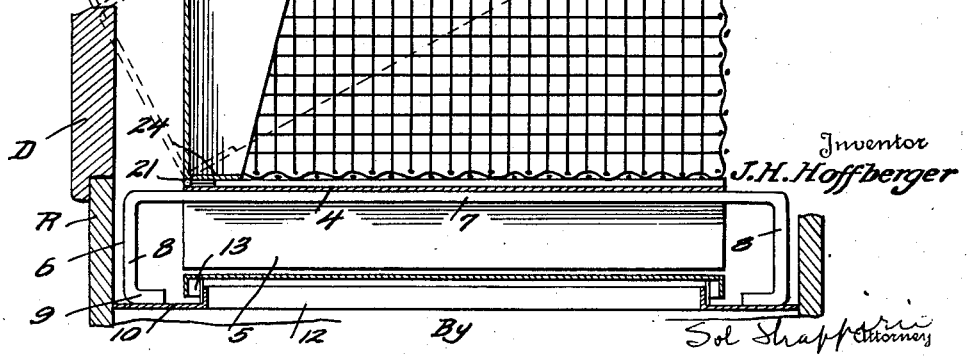

2,216,077

UNITED STATES PATENT OFFICE 2,216,077

TEMPERATURE REGULATOR FOR REFRIGERATORS

Jacob H. Hoffberger, Baltimore, Md., assignor to Merchants Terminal Corporation, Baltimore, Md., a corporation of Maryland Application August 13, 1932, Serial No. 628,749

16 Claims. (Cl. 62—46)

This invention relates to refrigerators, particularly those employing ice as the source of refrigeration, and is more particularly concerned with temperature regulation of the refrigeration in such refrigerators, particularly to maintain a substantially uniform temperature therein.

Among the objects and advantages of the present invention there may be mentioned particularly means for maintaining the temperature of ice refrigerators substantially uniform as long as some substantial amount of ice is present therein.

Other objects and advantages include means enabling conveniently the use of crushed ice for such temperature regulation.

Other and further objects and advantages will appear from the more detailed description set forth below, it being understood however that this more detailed description is given by way of illustration and explanation only, and not by way of limitation, since various changes may be made therein by those skilled in the art without departing from the scope and spirit of the present invention.

In connection with that more detailed description, there is shown in the accompanying drawings, in Figure 1 a fragmentary sectional view of the ice compartment of an ice refrigerator including the temperature regulator of the present invention; in Figure 2 a detail sectional view on lines 2—2 of Figure 1, particularly showing the temperature regulator; in Figure 3 a modified form of temperature regulator with means for utilizing crushed ice; in Figure 4 a transverse elevation partly in section of a modified form of temperature regulator; and in Figure 5 a side elevation of the temperature regulator of Figure 4.

More particularly, the present invention is concerned with means installed in the ice compartment of refrigerators utilizing ice, which means serve to maintain a substantially uniform temperature in the refrigerator as long as there is some reasonable and substantial amount of ice therein, even though said compartment may not be filled with ice. And said temperature regulation of the present invention, particularly allows and in fact facilitates the free circulation of air through the said ice compartment containing said temperature regulator with all of the desirable features, such as the washing of the air, resulting from said free circulation of air.

Referring more particularly to the form of invention shown in Figures 1 and 2 of the drawings, it will be seen that the ice refrigerator 1 carries the usual ice compartment 2, within which there may be, for example, the usual block of ice 3. In lieu of the usual ice rack frequently consisting of a corrugated plate on which the block of ice 3 is supported in such ice compartments of the refrigerators, the present invention includes a structure that enables substantial temperature regulation and maintenance even though the quantity of ice may materially vary.

For this purpose, the temperature regulator is desirably constructed as a substantially continuous flat metallic plate 4 of a size slightly less than that of the longitudinal cross section of the ice compartment, so that the plate may fit readily within said compartment and support ice therein. This plate 4 carries depending ribs or fins 5, angularly disposed with respect to the plane of the plate 4, and desirably made integral with that portion of the plate 4 from which said fins 5 project. As shown in Figure 1, for example, the fins 5 are desirably placed at right angles to the plane of the plate 4. This plate 4 with the depending fins 5 is desirably supported by legs 6 upon the bottom of the ice compartment. As shown in Figures 1 and 2, these supporting legs may consist of substantially inverted U-shaped members 7 attached as by riveting to the plate 4, one of each of said U-shaped members desirably being placed at each edge of the plate 4 as shown more particularly in Figure 1. These U-shaped members 7 are each provided with depending leg portions 8 at each end thereof, each leg portion 8 also having desirably an inturned foot portion 9 that rests directly on the floor 10 of the ice compartment 2. The supporting legs 6 are desirably in height slightly greater than the height of the depending fins 5, so that the latter fins are well within the space between the plate 4 and the bottom or floor 10 of the ice compartment and the cover member 60 placed above the floor opening 12. Since the depending fins 5 carried by the plate 4 are spaced apart from each other, and form spaces that are open at their ends, as shown at 11, the circulating air that enters within the ice compartment passes therethrough over the ice 3 directly under and within the spaces formed between the depending fins 5 before it enters the adjacent upper portion of the food compartment. The air, therefore, circulates within said spaces and in contact with the depending fins 5 after passing over and against the block of ice 3 to receive the usual washing and further refrigerating action of the block of ice 3.

As shown in Figure 1 particularly, the plate 4 and depending fins 5 may desirably be made in sections, so that it may be increased or decreased in width as desired. For this purpose, the plate 4 may, as shown, be divided into, for example, three sections, 14, 15 and 16, joined together by means of a tongue and groove attachment shown at 17. There may, of course, be as many desired sections of the plate 4 as are necessary for particular width of boxes, and the width of the plate 4 may, therefore, be increased or decreased by the addition of or subtraction of sections.

Desirably also cross ribs 18 are provided running transversely of the plate 4, which serve a double function: first for reenforcing the plate 4 when the latter is made of sections as shown, and also the ribs 18 serve to prevent slippage of the block of ice within the ice compartment 2, since the ice melts down about these ribs 18.

While as noted in connection with the description of the device as shown in the drawings, the supporting legs 6 are desirably carried on the plate 4, any other means for supporting the plate 4 within the ice compartment may be employed, as for example, projections on the walls of the ice compartment itself holding the plate 4 in position, but the structure illustrated is preferred.

In the modified form of device shown in Figure 3, provision is made for the use of crushed or broken ice. Crushed or broken ice is being supplied in some communities for refrigeration in lieu of block ice. For such purposes, the temperature regulator of the present invention may be utilized by the inclusion of a basket B for holding the crushed or broken ice. As shown in Figure 3, the basket B is desirably a wire basket, as indicated at 20. A wire basket is desirable because it increases the exposed surface of ice as against a solid basket, and enables greater washing of the air by the ice to take place than would be true where a solid basket was used. The basket B is mounted on and carried by the plate 4 of the temperature regulator. For this purpose the basket B may desirably be hinged as shown at 21 (Figure 3) to the front edge of the plate 4, with the basket resting directly on the upper face of the plate 4. In this case, the cross ribs 18 are not necessary, but they may be utilized particularly for reenforcement of the plate 4 where the latter is made in sections. Such basket and temperature regulator when utilized in the refrigerator R, is desirably positioned within the ice compartment thereof as shown in Figure 3, adjacent the door D of the refrigerator R. When the door D is open, the basket B may be swung about the hinge 21 so that it extends as shown in the dotted lines of Figure 3, outside of the ice compartment. This enables the basket B to be readily refilled with crushed or broken ice.

For such purposes further, the front side wall 22 of the basket B is desirably made solid as shown in Figure 3, or sheet metal may be passed about and attached to that wall of the basket B if a rectangular wire basket B is utilized. Desirably also the front portions of the side walls of the basket B adjacent the front side wall 22 are also either made solid, or the wire basket portions at these points are covered with sheet metal, as shown at 23 in Figure 3. In this connection also, the extreme front edge portion of the bottom of the basket may also be made solid, as shown at 24. The purpose of the solid walls 22, 23 and solid portion of the bottom 24, is to prevent dripping of water or loss of ice when the basket is tipped forward into the dotted line position of Figure 3 for refilling.

While a basket container for ice, such as that illustrated in Figure 3, may be utilized itself, desirably it is employed in connection with the temperature regulator on which it rests directly, as shown in Figure 3, so that the utility of the temperature regulator may be obtained together with the basket B. The modified form of basket B shown in the drawings may, however, be used by itself if desired as a container for crushed or broken ice. When the basket B is utilized in connection with the temperature regulator, that temperature regulator may be substantially identical with that set forth and described above in connection with Figures 1 and 2.

Referring to the modified form of temperature regulator shown in Figures 4 and 5, it will be noted in general that this type of temperature regulator differs from that of Figures 1 and 2 in the use of a V-shaped plate which supports the ice. In this form of the device, the V-shaped metallic plate 44 desirably slightly less in horizontal width than that of the longitudinal cross section of the ice compartment, is desirably produced from two metallic portions as shown, welded or otherwise joined along their meeting edges 44ª. This plate 44 carries depending ribs or fins 45, angularly disposed with respect to the plane of each portion of the plate 44, and desirably made integral with that portion of the plate 44 from which said fins 45 project. As shown in Figure 4, for example, the fins 45 are desirably placed at right angles to the plane of each section of plate 44. This plate 44 with depending fins 45 is desirably supported by legs 46 upon the bottom of the ice compartment. As shown in Figures 4 and 5, these supporting legs may consist of a substantially V-shaped member 47, upon which the plate 44 rests, one of each of said V-shaped supports being desirably placed as shown in Figure 5 at each edge of the plate 44, and each leg 46 may be made of a metal strap of a width slightly less than the distance between the adjacent depending fins 45, so that it may be held well within this space and support the plate 44 without further attachment, although of course the legs 46 may be attached to the V-shaped plate 44 rigidly in any desired manner. These supporting members 46 may each desirably be made as shown with a depending leg portion 48 at each end thereof, each leg portion also having an outturned foot portion 49 that rests directly on the floor of the ice compartment. The support legs 46 should be in height slightly greater than the height of the plate and depending fins measured in a vertical direction, so that the depending fins 45 are placed well within the space between the plate 44 and the bottom or floor of the ice compartment. Desirably as shown in Figure 4 of the drawings, the depending fins 45 are not continuous around the bottom of the plate 44, but are shown with cutaway portions, as indicated at 45ª, to provide a further circulating space. Since the depending fins 45 carried by the plate 44 are spaced apart from each other, and form spaces that are open at their ends, as shown in Figure 5, the circulating air that enters within the usual floor opening of the ice compartment, as explained particularly above in connection with Figures 1 and 2, passes directly under and within the spaces formed between the depending fins 45 before it enters the upper portion of the ice compartment. The air, therefore, circulates within and in contact with the depending fins 45 and portions of the bottom of the plate 44, and then passes over and against the block of ice to receive the further washing and refrigerating action of that ice in the ice compartment.

Again as explained in connection with the flat plate type of regulator shown in Figures 1 and 2, the plate 44 carrying the depending fins 45 may desirably be made in sections, as shown particularly in Figure 5, so that the width of plate may be increased or decreased as desired. As shown in Figure 5, the plate 44 may be made in three sections 54, 55 and 56 joined together by means of a tongue and groove attachment as shown at 57. There may, of course, be as many desired sections of the plate 44 as are necessary for a particular width of box, and the width of a given plate 44 may, therefore, be increased or decreased before welding or other assembly by the addition of or subtraction of sections.

In view of the particular form of depending fins 45 as shown in this modified structure of Figures 4 and 5, where portions of the depending fins are cut away as indicated at 45ª to give an additional circulating space, it may be desirable to utilize a drip arrester to collect any condensation or water formed on the fins 45. For this purpose a V-shaped trap or trough 50 may be utilized, passing under each corner 51 of the fins 45. The trap or trough 50 may be mounted in any desired way on the device, such as by ears 52 at each end of each trough or trap 50, each ear being attached as by a rivet 53, or other equivalent device to the outermost depending fin 45. The structure is fully illustrated in Figure 5.

In utilizing the invention, the temperature regulator either with or without the basket B, is inserted into the ice compartment 2 of the usual refrigerator, and ice is then placed within, either block ice 3 as shown in Figure 1, or crushed or broken ice within the basket B of the device as shown in Figure 3. In either case, the advantages of the present invention are obtained. The depending fins 5 on the plate 4 increase greatly the radiating surface of the plate 4, and at the same time insure continued and increased contact of the circulating air with the cold plate 4 and depending ribs 5. A fuller and more rapid cooling of the circulating air is thus obtained. This is particularly true even though the amount of ice within the ice compartment may be considerably reduced by melting, because as long as there is any substantial amount of ice within the ice compartment, the extensive radiating surfaces provided by the plate 4 and depending fins 5, insure substantial cooling of the air. Furthermore, since provision is made allowing the air after contact with the plate 4 and fins 5, to pass into contact with the ice in the usual way in Figures 1 and 2, or with the crushed or broken ice in the open basket of Figure 3, an extensive washing effect of the air is obtained. The increased radiating surface provided by the plate 4 and depending ribs 5 has been found to maintain a substantially uniform temperature within the refrigerator, even though the amount of ice therein may be considerably reduced in amount. Further the basket form of container for holding crushed or broken ice, enables the latter to be utilized together with the temperature regulator of the present invention, and when the basket is hingedly mounted on the temperature regulator, it is readily removed sufficiently from the ice compartment for ready refilling, the solid front and side portions preventing drip from the crushed ice.

The modified form of device shown in Figures 4 and 5 maintains a somewhat colder temperature in the box than does the device of Figures 1 and 2, due to the fact that there is a greater fin area for contact with the circulating air, and for lowering its temperature.

The temperature regulator of the present invention supplies means which in contact with the ice develops a large surface for contact with the air in the refrigerator due to the fact that the plate and fins are both chilled. This holds the refrigeration or cold at a substantially uniform temperature, even though the amount of ice in the compartment has been materially decreased below the normal supply in a compartment of the same size. This effect of maintained cold is also secured even though the box is opened from time to time due to the large chilled surfaces in contact with the air in the refrigerator, so that there is less tendency for variation in the temperature in the box, and materially prevents the temperature of the refrigerator chamber from varying to that degree that takes place in the absence of said temperature regulator.

This device may also be used for similar purposes and with the same results and effects in display cases holding food products or other commodities requiring refrigeration where ice is used as the refrigerant, as well as in compartments or bunkers of refrigerator cars or other vehicles utilized in the transportation of perishable products.

Having thus set forth my invention, I claim:

1. A temperature regulator for a refrigerator of the type in which an ice compartment is separated from the food compartment, said temperature regulator comprising a continuous metallic plate, having fins projecting from one side of the plate and forming channels, and means for supporting the plate between the ice and food compartments and above the bottom of the ice compartment with the fins directed toward the food compartment, to increase the radiating surface of the plate.

2. A temperature regulator for a refrigerator of the type in which an ice compartment is separated from the food compartment, said temperature regulator comprising a continuous metallic plate, legs carried by the plate for supporting said plate above the bottom of said ice compartment to provide a space between said plate and the bottom of said ice compartment, fins carried by said plate and angularly disposed with respect thereto and extending into the space between the plate and the bottom of said ice compartment to increase the radiating surface of the plate, and ribs carried on the face of said plate opposite to that carrying the fins to prevent slippage of a block of ice resting on said plate.

3. A temperature regulator for refrigerators having the usual ice and food compartment, said temperature regulator comprising a metallic plate, metal fins carried by said plate and angularly disposed with respect thereto the metal fins being spaced from one another to provide spaces between said fins, so that when the plate is placed in position in a refrigerator between the ice and food compartments, the spaces between the fins open toward the food compartment of the refrigerator, the fins increasing the radiating surface of the plate, and an ice basket carried in heat transfer relation to and by said plate for holding crushed ice.

4. A temperature regulator for a refrigerator of the type in which an ice compartment is separated from a food compartment by a partition, said temperature regulator comprising a metallic plate, having a series of spaced fins projecting from one side of the plate and forming channels, and means secured to the plate for engaging the partition to hold the plate spaced from the partition with the fins directed toward the food compartment, and an ice basket carried in heat transfer relation to and by said plate for holding crushed ice.

5. An ice container comprising a supporting plate, a basket defined by a solid side wall, a bottom wall, and other walls made of wire mesh, the basket being hinged along an edge of said solid wall to the supporting plate.

6. In combination, an ice refrigerator having the usual ice compartment, a temperature regulator supported within said ice compartment, said regulator comprising a continuous metallic plate for supporting ice within said ice compartment, means for spacing said plate from the floor of said ice compartment, and fins carried by the plate and angularly disposed with respect thereto and extending into the space between said plate and the bottom of the ice compartment to increase the radiating surface of the plate.

7. In combination, an ice refrigerator having the usual ice compartment, a temperature regulator supported within said ice compartment, said regulator comprising a metallic plate for supporting an ice basket within said ice compartment, means for spacing said plate from the floor of said ice compartment, fins carried by the plate angularly displaced with respect thereto and extending into the space between said plate and the bottom of the ice container to increase the radiating surface of the plate, and an ice basket carried in heat transfer relation to and by said plate for holding crushed ice.

8. In combination, an ice refrigerator having the usual ice compartment, a temperature regulator supported within said ice compartment, said regulator comprising a metallic plate for supporting ice within said ice compartment, means for spacing said plate from the floor of said compartment, fins carried by the plate angularly disposed with respect thereto and extending into the space between said plate and the bottom of the ice container to increase the radiating surface of the plate, an ice basket carried by said plate for holding crushed ice, said basket being hingedly mounted on said plate for swinging movement thereon, whereby the basket may be moved out of the ice compartment to facilitate filling of the basket with crushed ice.

9. In combination, an ice refrigerator having the usual ice compartment and a container for crushed ice placed within said ice compartment, said container including a base plate and an ice basket mounted in heat transfer relation with and on said plate for swinging movement whereby the basket may be moved out of the ice compartment to facilitate filling of the basket with crushed ice.

10. In combination, an ice refrigerator having the usual ice compartment, a temperature regulator supported within said ice compartment, said regulator comprising a metallic plate for supporting an ice basket within said ice compartment, means for spacing said plate from the floor of said ice compartment, fins carried by the plate angularly disposed with respect thereto and extending into the space between said plate and the bottom of the ice container to increase the radiating surface of the plate, and a wire ice basket carried by said plate for holding crushed ice, said basket being hingedly mounted on said plate for swinging movement, the basket being closed along that side wall toward which the basket swings when moved on said hinge, whereby the basket may be moved out of the ice compartment to facilitate filling of the basket with crushed ice while avoiding drippings from any ice within the basket.

11. A temperature regulator for a refrigerator having the usual ice and food compartment, said temperature regulator comprising a V-shaped metallic plate and metal fins carried by the plate angularly disposed with respect thereto and open toward the food compartment to increase the radiating surface of the plate.

12. A temperature regulator for refrigerators having the usual ice compartment, said temperature regulator comprising a V-shaped metallic plate, having a series of spaced fins projecting from one side of the plate and forming channels, and means secured to the plate for engaging the partition to hold the plate spaced from the partition with the fins directed toward the food compartment.

13. In combination, an ice refrigerator having the usual ice compartment, a temperature regulator supported within said ice compartment, said regulator comprising a V-shaped metallic plate for supporting ice within said ice compartment, means for spacing said plate from the floor of said ice compartment, and fins carried by the plate and angularly disposed with respect thereto and extending into the space between said plate and the bottom of the ice container to increase the radiating surface of the plate.

14. In combination, an ice refrigerator having the usual ice compartment and a container for crushed ice placed within said ice compartment, said container including a solid metallic finned base plate and an ice basket mounted on said plate for swinging movement, whereby the basket may be moved out of the ice compartment to facilitate filling of the basket with crushed ice.

15. A temperature regulator for a refrigerator of the type in which an ice compartment is separated from a food compartment by a partition, said temperature regulator comprising a continuous metallic plate having a series of spaced fins projecting from one side of the plate and forming channels, and legs carried by the plate for engaging the partition to hold the plate spaced from the partition with the fins directed toward the food compartment.

16. In combination, a refrigerator casing, a drip pan secured therein and dividing the refrigerator space into a food compartment and an ice compartment, a temperature regulator within said ice compartment, the temperature regulator comprising a V-shaped metallic plate, and means engaging the drip pan and supporting the V-shaped member above said drip pan, fins carried by said metallic plate and angularly disposed with respect thereto, said fins extending into the space between the plate and the drip pan to increase the radiating surface of the plate.

JACOB H. HOFFBERGER.